(12) United States Patent
Tzeng et al.

(10) Patent No.: US 11,163,335 B1
(45) Date of Patent: Nov. 2, 2021

(54) PORTABLE INFORMATION HANDLING SYSTEM HAVING A BENDABLE INTEGRATED DISPLAY

(71) Applicant: Dell Products L.P., Round Rock, TX (US)

(72) Inventors: Chun-Kai Tzeng, Keelung (TW); Chin-Chung Wu, New Taipei (TW); Bradford E. Vier, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/864,246

(22) Filed: May 1, 2020

(51) Int. Cl.
*G06F 1/16* (2006.01)
*G09G 3/3208* (2016.01)

(52) U.S. Cl.
CPC .......... *G06F 1/1641* (2013.01); *G06F 1/1616* (2013.01); *G06F 1/1652* (2013.01); *G06F 1/1681* (2013.01); *G09G 3/3208* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,128,662 A * | 7/1992 | Failla | ........ | G06F 1/1601 248/924 |
| 6,381,128 B1 * | 4/2002 | Kramer | ........ | G06F 1/1624 312/223.1 |
| 8,432,331 B2 * | 4/2013 | Schilling | ........ | H04M 1/0247 345/1.3 |
| 8,539,705 B2 * | 9/2013 | Bullister | ........ | G06F 1/1615 40/733 |
| 9,843,758 B2 * | 12/2017 | Park | ........ | G09G 3/03 |
| 9,846,450 B2 * | 12/2017 | Park | ........ | H04M 1/0266 |
| 9,864,221 B2 * | 1/2018 | Lee | ........ | G02F 1/133308 |
| 10,031,554 B2 * | 7/2018 | Yanagisawa | ........ | A61B 5/18 |
| 10,061,360 B1 * | 8/2018 | Magi | ........ | G06F 1/1616 |
| 10,401,908 B2 * | 9/2019 | Chen | ........ | G06F 1/1652 |
| 10,509,440 B2 | 12/2019 | Hussa | | |
| 10,772,224 B2 * | 9/2020 | Lan | ........ | H05K 5/0017 |
| 2009/0275366 A1 * | 11/2009 | Schilling | ........ | G06F 1/1654 455/566 |
| 2013/0155655 A1 * | 6/2013 | Lee | ........ | G09F 9/33 362/97.1 |
| 2014/0098095 A1 | 4/2014 | Lee et al. | | |
| 2015/0331445 A1 * | 11/2015 | Liu | ........ | G06F 1/162 361/679.27 |

(Continued)

*Primary Examiner* — Lisa Lea-Edmonds
(74) *Attorney, Agent, or Firm* — Zagorin Cave LLP; Robert W. Holland

(57) ABSTRACT

A curved display integrates in a portable information handling system housing to present visual images to an end user about an arc for improved viewing angle. The portable information handling system rotates the housing from an open position that exposes the display in a curved configuration to a closed position that brings the display against a main housing portion with the display transitioned from the curved to a planar configuration for a low profile storage position. Display curve is managed with a curved support frame that bends to a planar form, a pair of perpendicular-axis hinges that rotate opposing housings about a horizontal axis and manage display curve about a vertical axis, and a dual axis hinge with a sliding bracket that adjusts for greater housing spacing in the curved configuration.

16 Claims, 12 Drawing Sheets

(56) References Cited

U.S. PATENT DOCUMENTS

| | | |
|---|---|---|
| 2016/0034047 A1 | 2/2016 | Lee et al. |
| 2016/0127674 A1* | 5/2016 | Kim ................ H04N 21/42204 |
| | | 348/739 |
| 2016/0192519 A1* | 6/2016 | Song ................ G02F 1/133308 |
| | | 361/679.01 |
| 2018/0164977 A1 | 6/2018 | Seo et al. |
| 2019/0340964 A1* | 11/2019 | Kwon .................... G09G 3/035 |

* cited by examiner

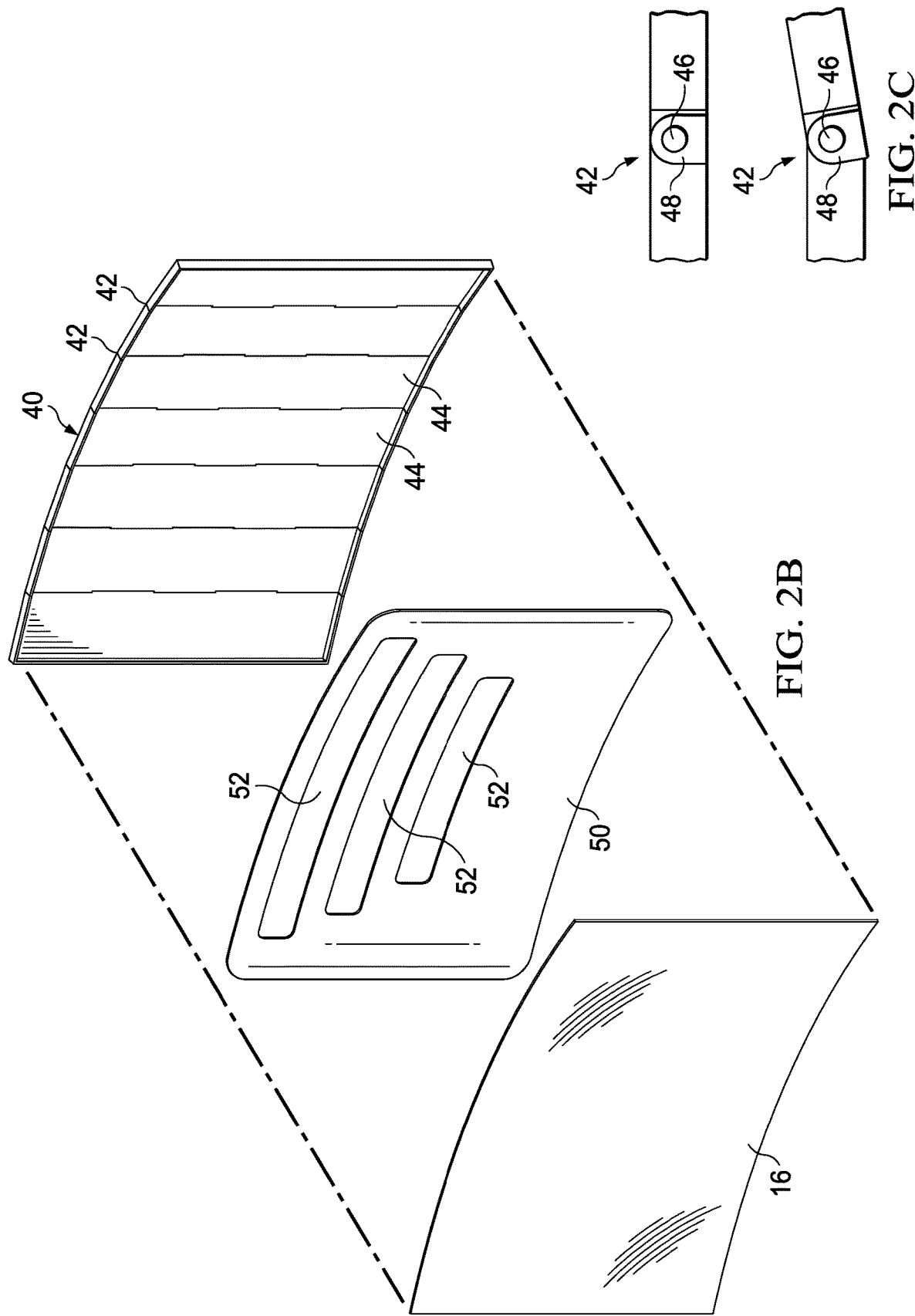

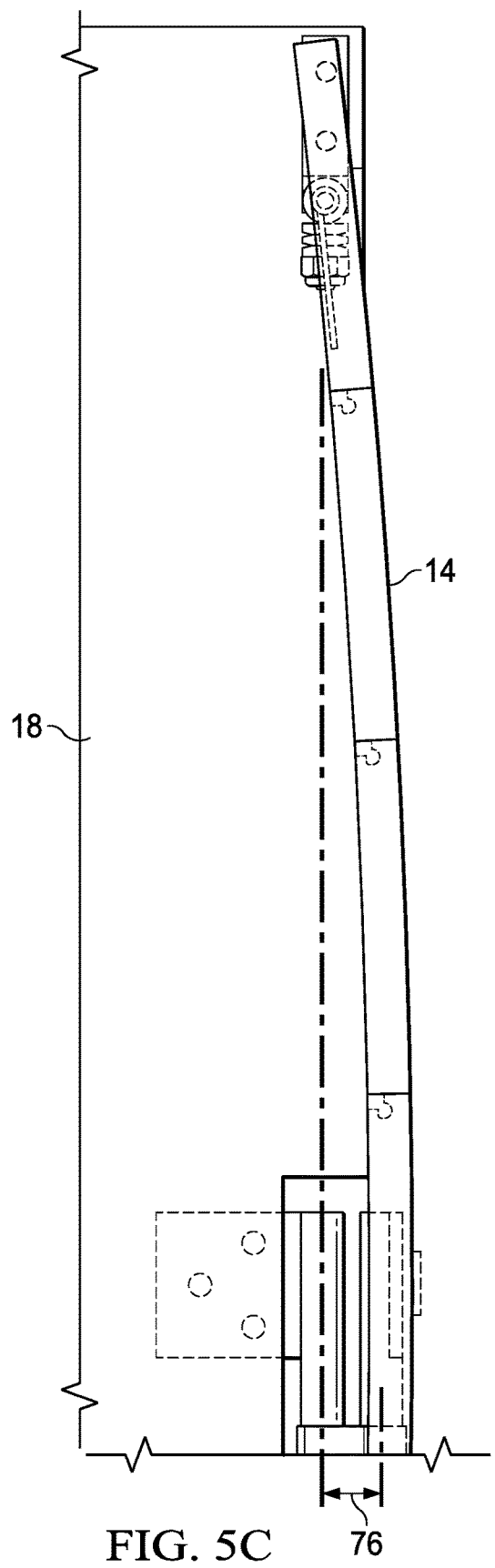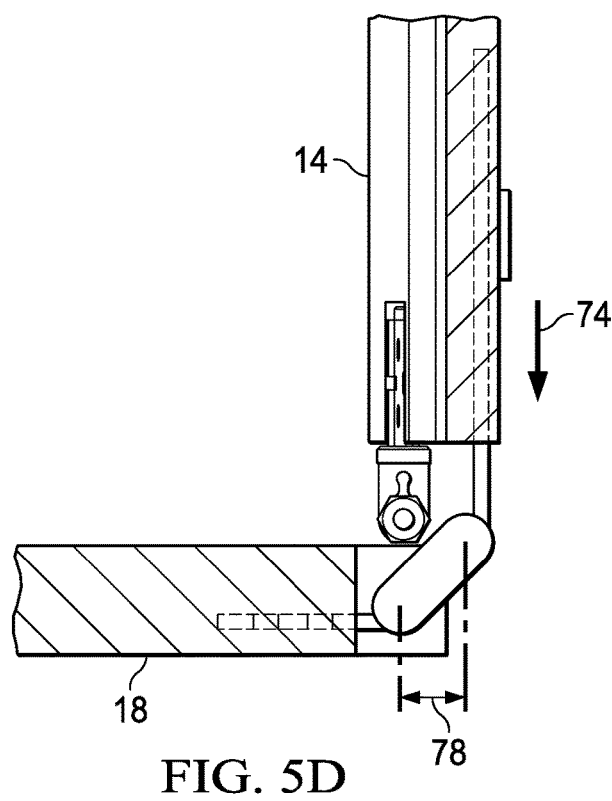
FIG. 5C
FIG. 5D

PORTABLE INFORMATION HANDLING SYSTEM HAVING A BENDABLE INTEGRATED DISPLAY

BACKGROUND OF THE INVENTION

Field of the Invention

The present invention relates in general to the field of portable information handling systems, and more particularly to a portable information handling system having a bendable integrated display.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Convertible configurations of portable information handling systems typically include multiple separate housing portions that rotationally couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Portable information handling systems have conventionally integrated liquid crystal display (LCD) panels in the lid portion to minimize the lid portion thickness. Recently, organic light emitting diode (OLED) display films have been adopted to replace LCD flat panels. OLED display films provide a thinner display solution in that OLED pixels generate illumination directly instead of relying upon passage of illumination from a backlight. In addition, OLED display films bend so that the display can fold at installation to conform to a curved housing and, in some instances, after installation to conform to a housing as the housing flexes to change its shape. As an example, some portable information handling systems dispose a single continuous OLED film across both the lid and main housing portions by folding the film over a hinge that rotationally couples the lid and main housing portions to each other. In such an embodiment, a virtual keyboard may be presented at the OLED display over the main housing portion as a replacement for an integrated mechanical keyboard. Such implementations help to reduce the thickness of the information handling system by removing the keyboard, thus providing improved mobility when the housing portions close. The hinge fold of the display is along a horizontal axis relative to the end user.

LCD and OLED flat panel displays are also used in peripheral display devices, such as those that interface to an information handling system through an external display cable. In some cases, these peripheral displays have become rather large to present information as visual images across an increased display surface area. With such larger displays, the viewing angle of an end user can vary between the center of the display and the outer edges so that pixels have a varied appearance to the end user. To address this issue, peripheral displays can include a curve about a vertical axis so that the end user viewing angle is more constant at the edges and center of the display. Typically, such curved peripheral displays have the LCD panel or OLED film coupled to a fixed frame with a defined viewing angle relative to the end user.

SUMMARY OF THE INVENTION

Therefore, a need has arisen for a system and method which integrates a bendable display in a portable information handling system to adjust the display orientation to adapt to end user viewing angle.

In accordance with the present invention, a system and method are provided which substantially reduce the disadvantages and problems associated with previous methods and systems for integrating a bendable display into a portable information handling system. A portable information handing system integrated display transitions between a planar configuration in a housing closed position to enhance portability and a curved configuration in a housing open position to enhance end user viewing. An arrangement of hinges rotationally couples housing portions to adapt to the display configuration as the display curves and flattens about a vertical axis that is perpendicular relative to a horizontal axis about which the housing portions rotate.

More specifically, a portable information handling system processes information with processing components disposed in a portable housing main housing portion, such as a CPU and memory that cooperate to execute instructions. The information is presented as visual images at an OLED or a POLED display film integrated in a lid housing portion having a flexible frame that adapts to planar and curved configurations with a fold about a central horizontal axis of the housing portion. The main and lid housing portions rotationally couple with an arrangement of three hinges that cooperate with the lid housing portion to adjust the display film between curved and planar configurations. First and second perpendicular-axis hinges couple at opposing ends of the main and lid housing portions to rotate the housing portions between open closed positions at a horizontal axis and to adapt to changes in the curved configuration of the lid housing portion with rotation at a vertical axis. A central dual axis hinge disposed between the perpendicular-axis hinges couples to the housing with a sliding bracket that adjusts to changes in distance between the main and lid housing portions introduced by the curved configuration.

The present invention provides a number of important technical advantages. One example of an important technical advantage is that an OLED display film integrated into a portable information handling system housing portion folds as the housing rotates to an open position to present visual images at the display film to an end user with a surface curved about a vertical axis. The curved display film improves visual information presentation by adapting the display to an end user's viewing angle. At transition from the open viewing position to a closed storage position, the housing transitions from the curved to a flat configuration for a minimal thickness of the information handling system. The display films support surface automatically adapts the display film curve in response to transitions between housing open and closed positions in a controlled manner that minimizes risk of damage to the display film.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2A, 2B and 2C depict an example embodiment of a lid housing portion to support transition between planar and curved configurations;

FIGS. 5A, 5B, 5C and 5D depict a rear perspective view of the information handling system in the closed and open positions;

DETAILED DESCRIPTION

A portable information handling system integrates a display film in a housing that transitions between a curved configuration for end user viewing and a planar configuration for storage and improved mobility. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
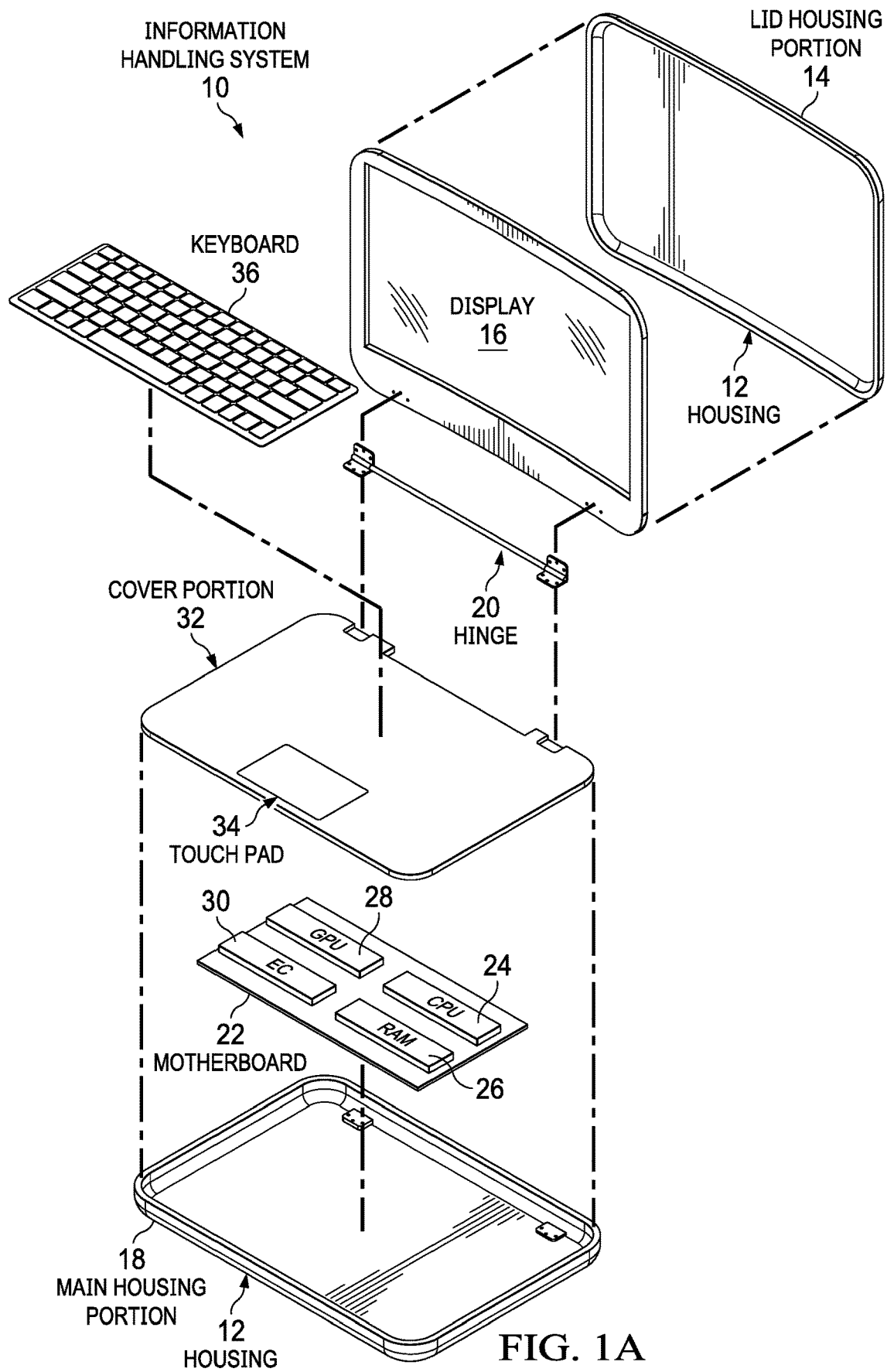
FIGS. 1A, 1B and 1C depict an information handling system having an integrated display that transitions between curved and planar configurations.
Figure 1B:
Figure 1C:
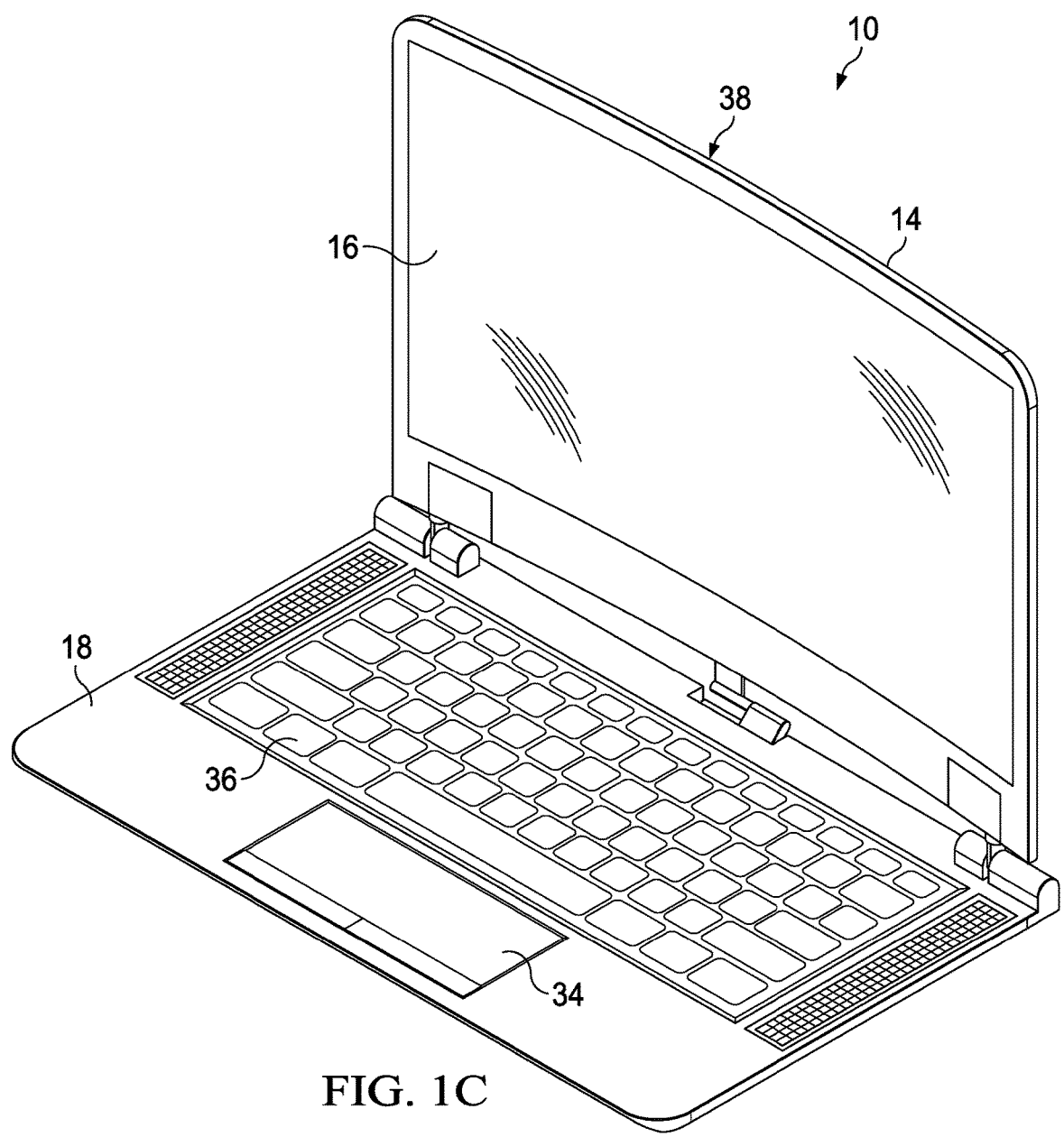

Referring now to FIGS. 1A, 1B and 1C, an information handling system having an integrated display that transitions between curved and planar configurations is depicted. FIG. 1A depicts an exploded view of information handling system 10 built in a housing 12 having a lid housing portion 14 rotationally coupled to a main housing portion 18 by a hinge assembly 20. A display 16 integrates in lid housing portion 14 and, as is explained in greater depth below, has a curved configuration relative to an end user viewing the display that is supported by hinge assembly 20. Information handling system 10 processes information with processing components disposed in main housing portion 18 on a motherboard 22. In the example embodiment, a central processing unit (CPU) 24 executes instructions stored in random access memory (RAM) 26 to process information stored in RAM 26. An embedded controller 30 manages operation of physical conditions within housing 12, such as power distribution, thermal constraints and input device interactions. A graphics processor unit (GPU) 28 interfaces with CPU 24 and display 16 to generate pixel values that define visual images for presentation at display 16. A housing cover portion 32 couples over main housing portion 18 to protect the processing components and support a keyboard 36 and touchpad 34 that accept end user inputs. FIG. 1B depicts a side view of information handling system 10 with lid housing portion 14 rotated to a closed position relative to main housing portion 18. In the closed position, both main housing portion 18 and lid housing portion 14 have a planar configuration so that housing 12 has a minimal thickness for improved mobility. FIG. 1C depicts a side perspective view of information handling system 10 with lid housing portion 14 rotated approximately 90 degrees to an open position relative to main housing portion 18. In the open position, also referred to as a clamshell position, main housing portion 18 supports lid housing portion 14 in a raised viewing position. In the example embodiment, lid housing portion 14 has a curved configuration so that display 16 is disposed around a vertical axis and angled relative to the end user viewing the visual images. As described in greater detail below, lid housing portion 14 and display 16 bend to transition between the curved and planar configurations of the closed and open housing positions.

Figure 2A:
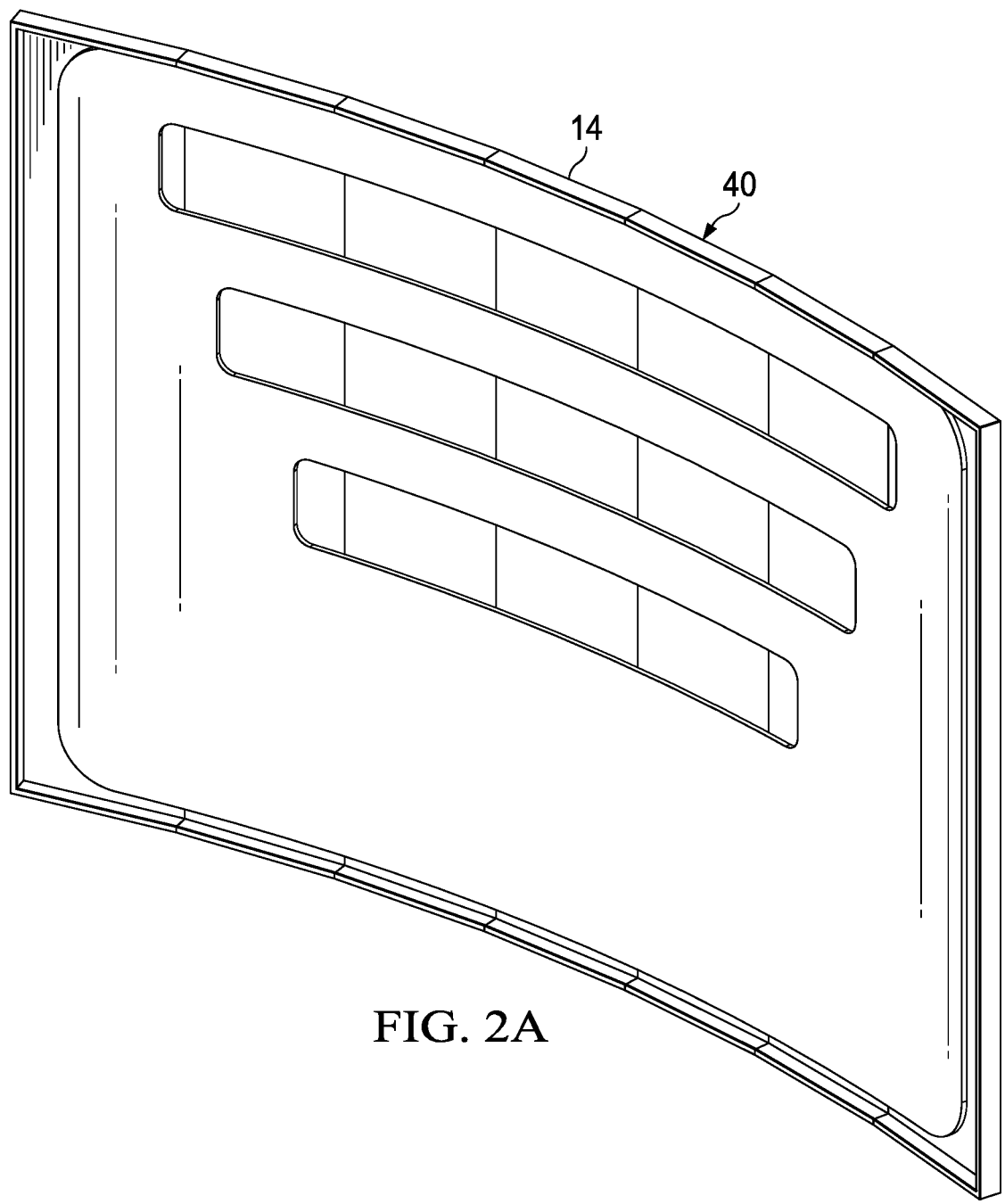

Referring now to FIGS. 2A, 2B and 2C, an example embodiment is depicted of a lid housing portion 14 to support transition between planar and curved configurations. FIG. 2A depicts lid housing portion 14 with the display film removed and bent to the curved configuration. FIG. 2B depicts an exploded view of lid housing portion 14 with a display film 16 aligned to couple to lid housing portion 14. Lid housing portion 14 segmented portion 40, which is built from a plurality of segments 44 that are each rotationally coupled in a vertical axis by pin-joint hinges 42. As illustrated by FIG. 2C, pin-joint hinges 42 have a rounded inner portion 48 rotationally coupled to an adjacent inner portion 48 with a pin 46 so that the rounded shape permits motion in one direction from the planar configuration to the curved configuration but not rotation in the opposite direction and past the planar alignment. A pre-bent curve metal frame 50 couples to segmented portion 40 and provides direct support to display film 16, which couples to frame 50. Display film 16 is, for instance, an organic light emitting diode (OLED) display film or a plastic OLED (POLED) display film, although other types of bendable display films may be used. Frame 50 is a sheet metal frame formed to have a curved shape, such as rolled stainless steel or various superelastic materials like nickel titanium. Openings 52 formed in the sheet metal adjusts the rigidity of the material. In the example embodiment, larger openings are located away from the system hinge with the openings having a smaller area closer to the hinge. Various types of sheet metal or other material of various thicknesses may be used to achieve a bias force by frame 50 towards the curved configuration.

Figure 3A:
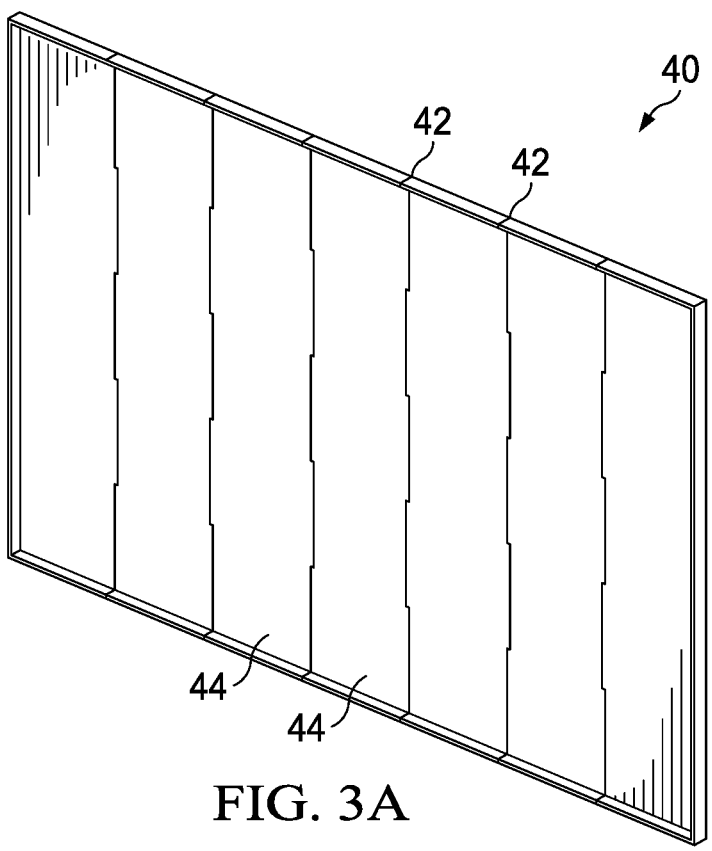
FIGS. 3A, 3B, 3C and 3D depict a segmented portion 40 that provides support to the display for transitions between curved and planar configurations.
Figure 3B:
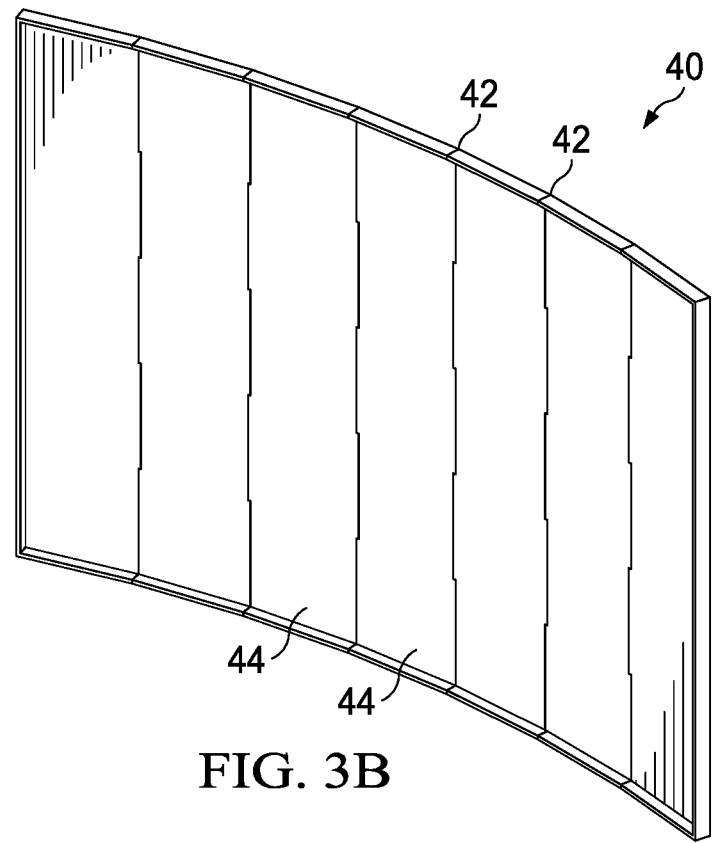
Figure 3C:
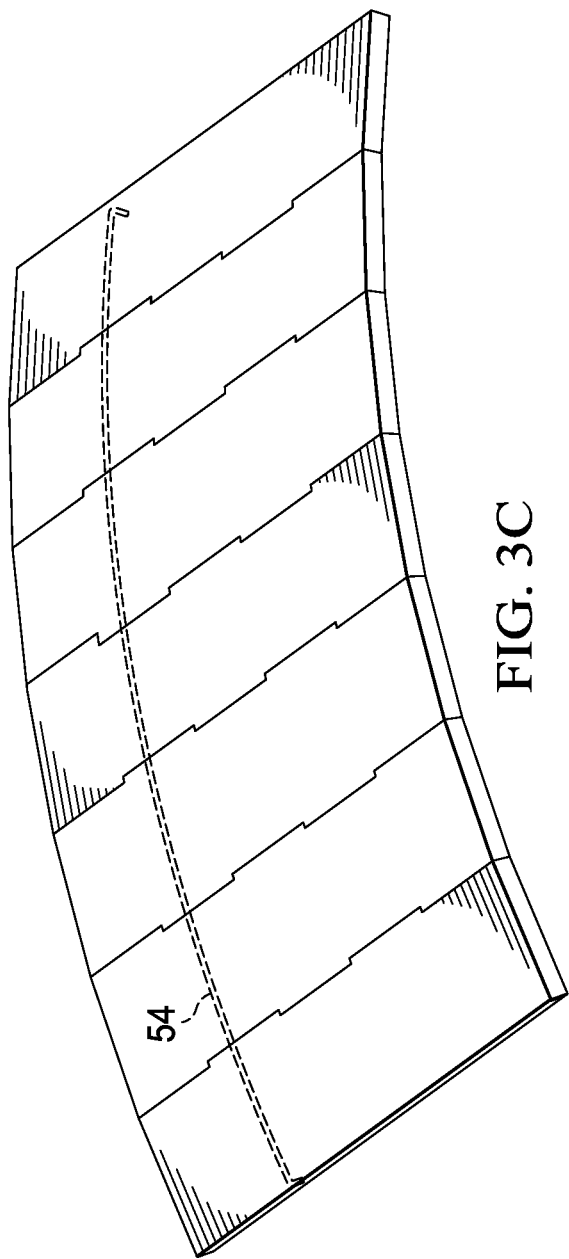
Figure 3D:
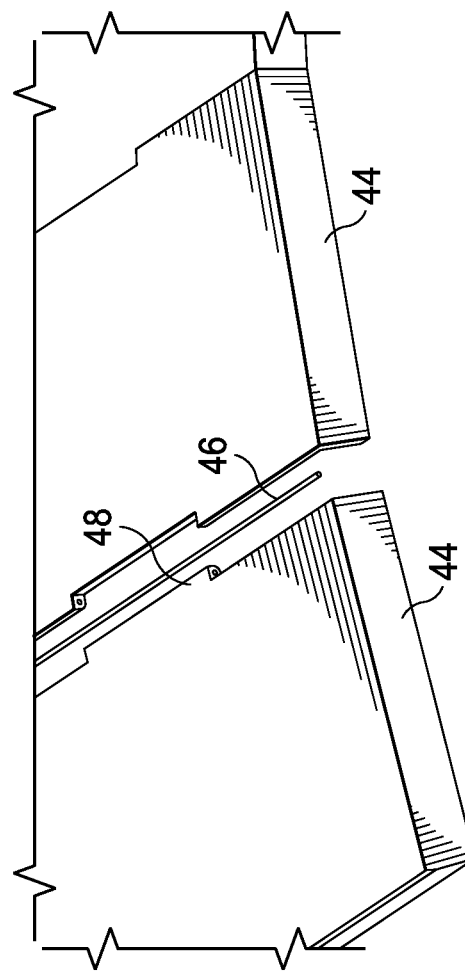

Referring now to FIGS. 3A, 3B, 3C and 3D, a segmented portion 40 is depicted that provides support to the display for transitions between curved and planar configurations. FIG. 3A depicts segmented portion 40 in a planar configuration having all of the segments 44 in a common plane. Segmented portion 40 bends in only one direction to the curved configuration depicted by FIG. 3B with segments 44 rotated about a vertical axis at pin joint hinges 42. FIG. 3C depicts a rear perspective view of segmented portion 40 in the curved configuration and having the segments 44 joined together as indicated by sectional view 54 running along a horizontal axis across the curve rotation. FIG. 3D depicts an exploded view of segments 44 rotationally coupled by pin-jointed hinges 42. Pin 46 inserts through overlapped rounded portions 48 to rotationally interlock segments 44.

Figure 4:
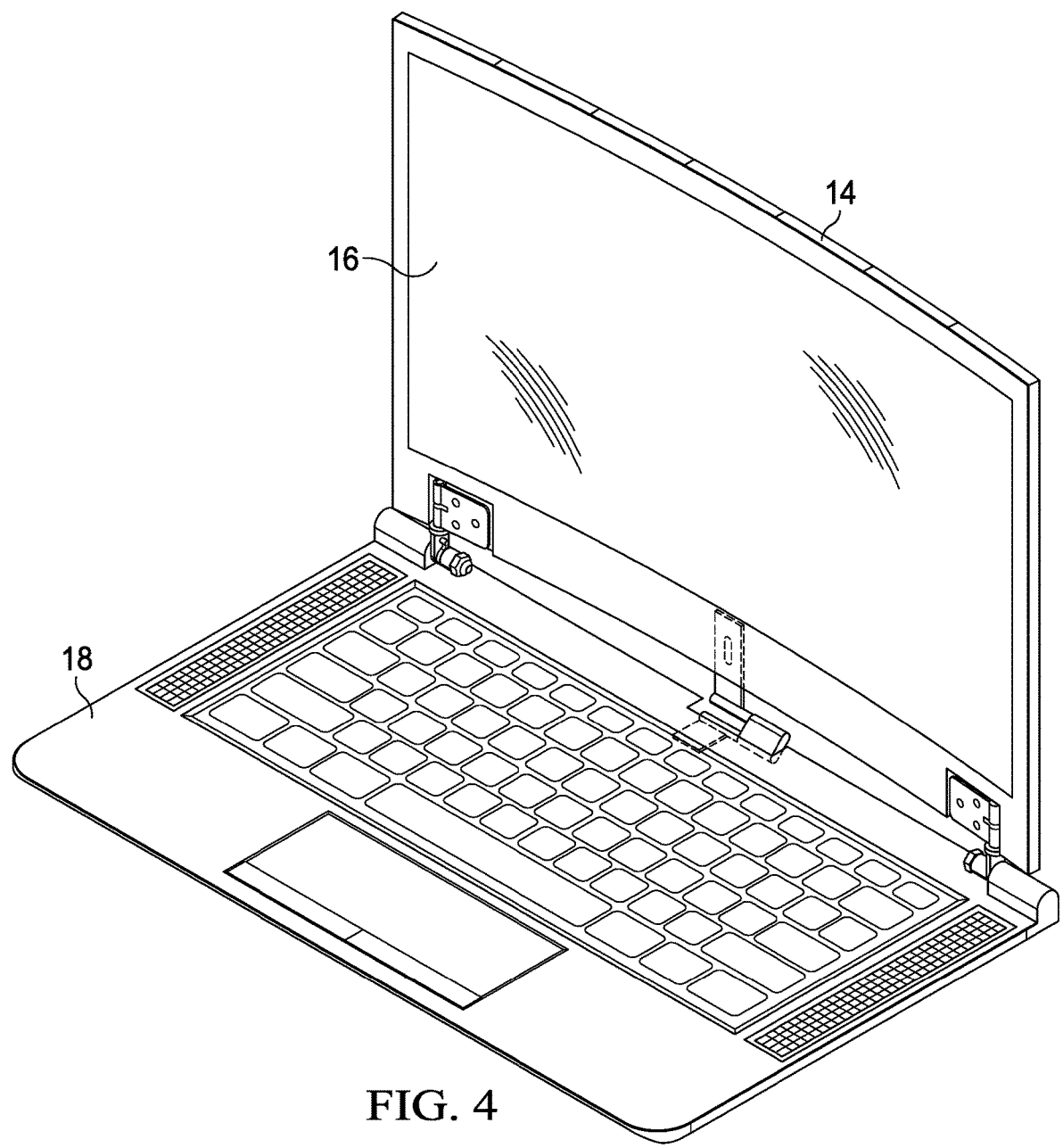
FIGS. 4, 4A, 4B, 4C and 4D depict an example embodiment of the hinge assembly implemented with three separate hinges.
Figure 4A:
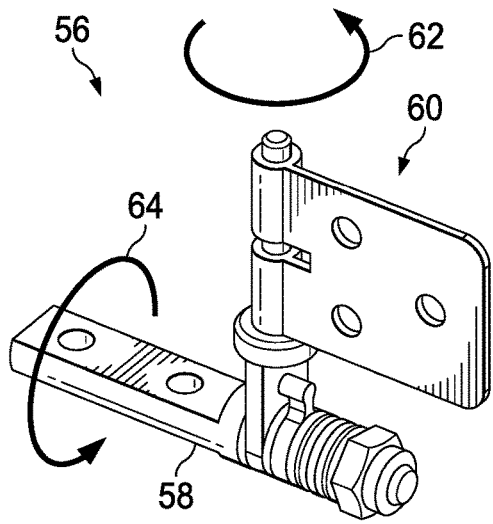
Figure 4B:
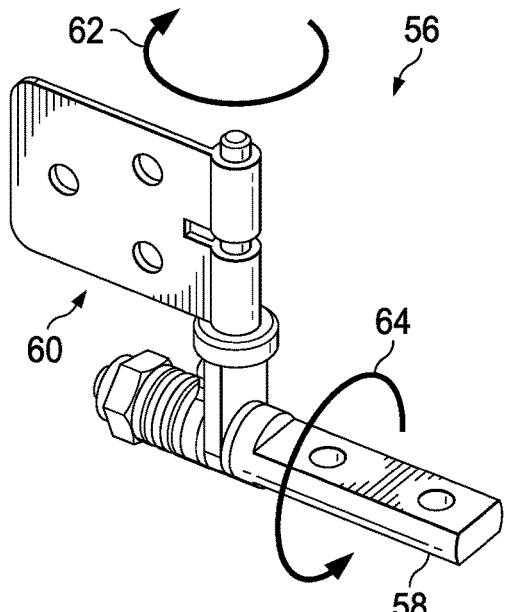
Figure 4C:
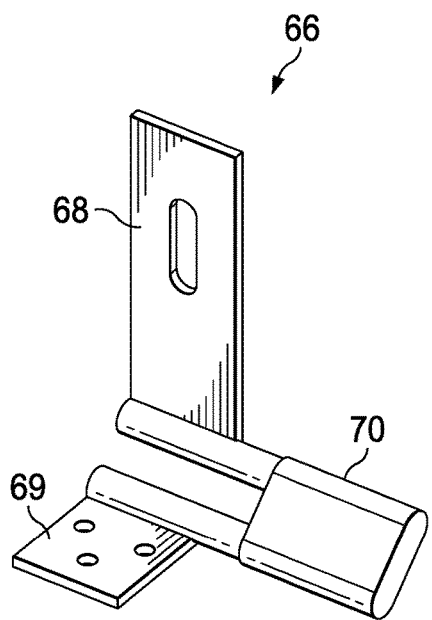
Figure 4D:
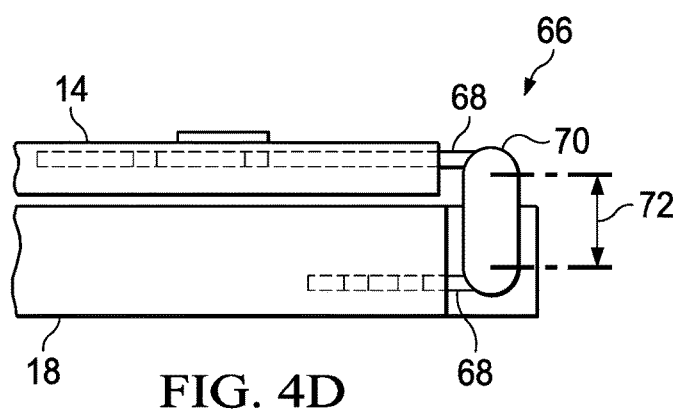

Referring now to FIGS. 4, 4A, 4B, 4C and 4D, an example embodiment of the hinge assembly is depicted and implemented with three separate hinges. A left perpendicular-axis hinge 56 shown by FIG. 4A and a right perpendicular-axis hinge 56 shown by FIG. 4B rotationally couple lid housing portion 14 to main housing portion 18 while compensating for bending of lid housing portion 14 during transitions between planar and curved configurations. A horizontal axis 58 couples to main housing portion 18 to support rotation between the closed and open positions as shown by arrow 64. A vertical axis 60 couples to lid housing portion 14 and rotates about the vertical axis as shown by arrow 62 as the curve shape of lid housing portion 14 changes. Each horizontal axis 58 includes a torque generator to regulate rotational motion and position of the housing. FIG. 4C depicts a dual axis hinge 66 having a sliding bracket 68 that couples to lid housing portion 14 and a fixed bracket 69 that couples to main housing portion 18. A synchronization mechanism 70 regulates rotation of the main and lid housing portions, such as with integrated gears. As illustrated by FIG. 4D, dual axis hinge 66 synchronizes housing rotation so that a closed position brings main housing portion 18 and lid housing portion 14 into proximity with lid housing portion 14 driven by the synchronization mechanism 70 to the planar configuration. In the planar configuration, sliding bracket 68 slides inward at lid housing portion 14 and the distance 72 defined by synchronization mechanism 70 provides a compressing force that biases housing 14 to the planar configuration. Sliding bracket 68 slides out of lid housing portion 14 during rotation from the closed to an open position to provide increased spacing between lid housing portion 14 and main housing portion 18 to adapt to the curved configuration. Rotation to the open position drives lid housing portion 14 to the curved configuration with the curve biased into the support frame and the orientation driven by synchronization mechanism 70.

Figure 5A:
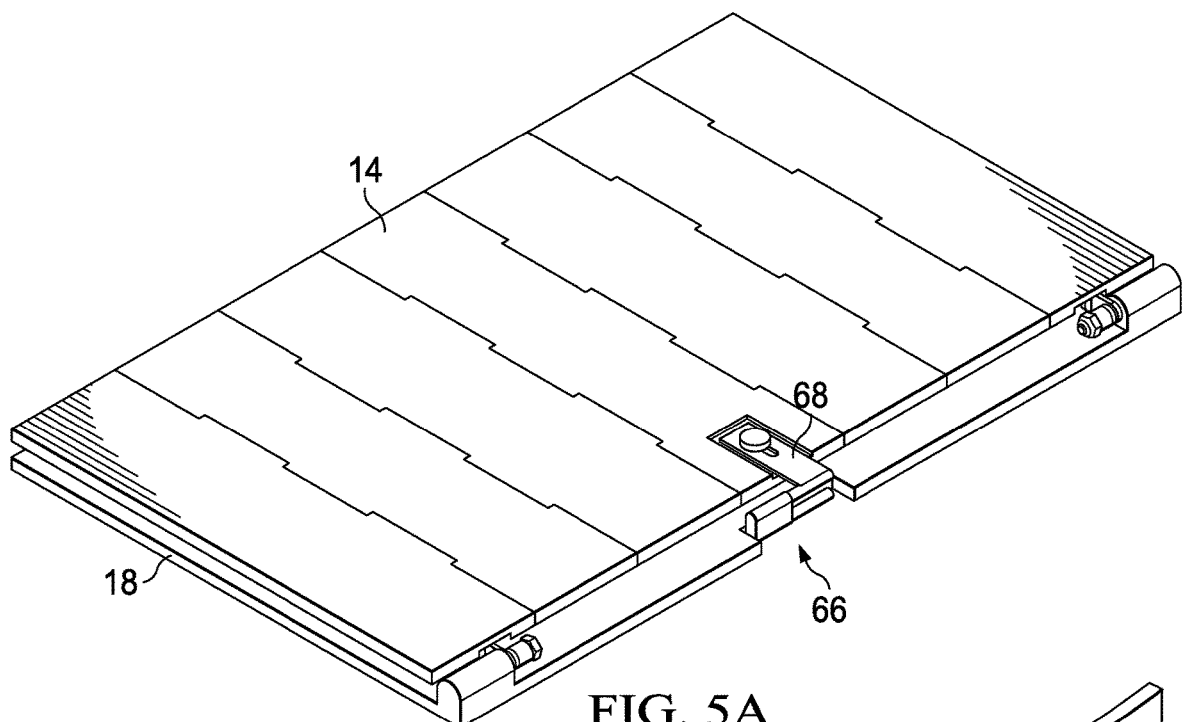
Figure 5B:
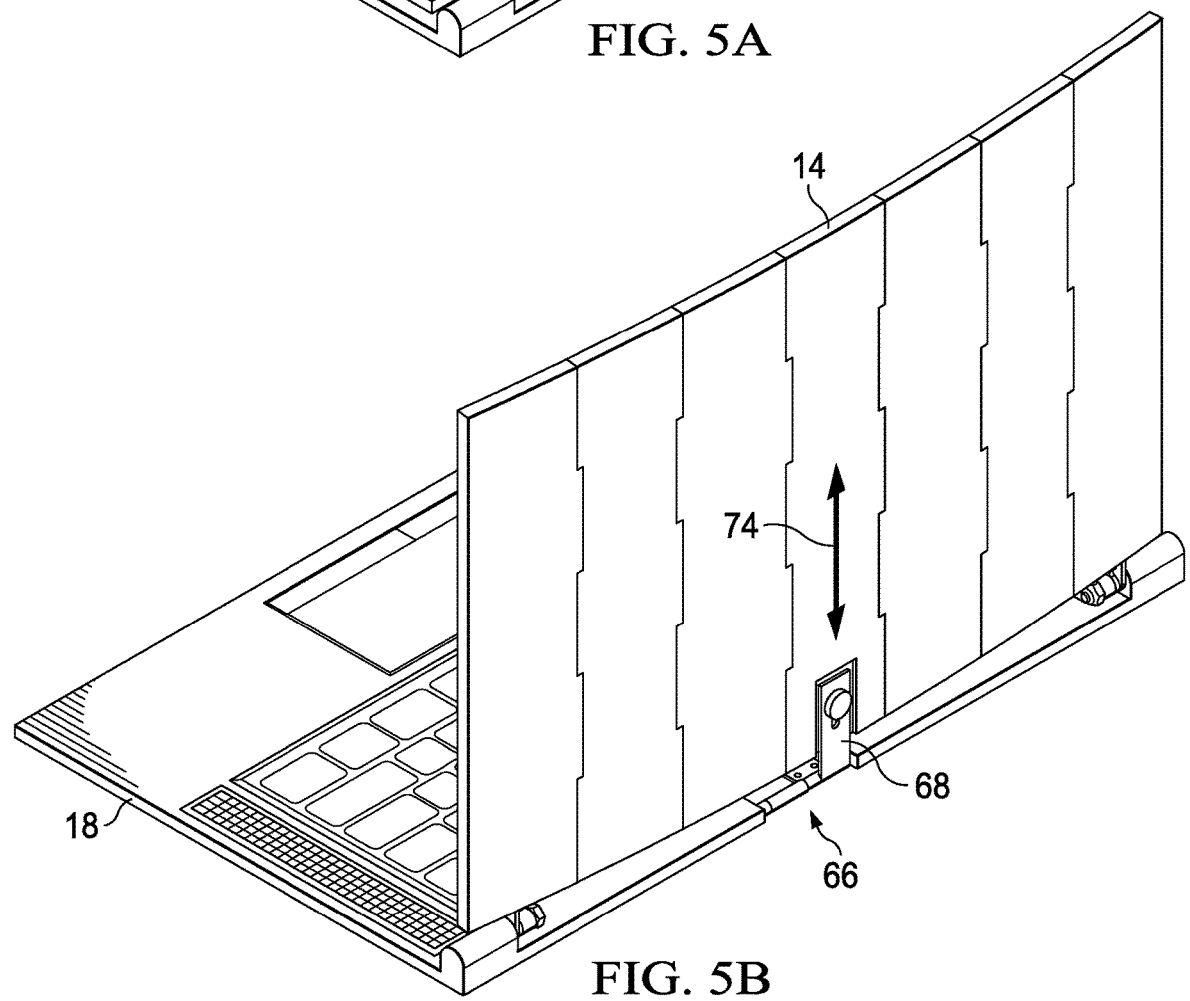

Referring now to FIGS. 5A, 5B, 5C and 5D, rear perspective views depict information handling system 10 in the closed and open positions. FIG. 5A depicts information handling system 10 in the closed position with the hinge assembly exposed and sliding bracket 68 slides inwards at lid housing portion 14 as the planar configuration reduces the distance between lid housing portion 14 and main housing portion 18. FIG. 5B depicts rotation of lid housing portion 14 to the open position where the curve bias of the display frame sheet metal drives lid housing portion 14 to a curved configuration. The curved configuration increases the distance between lid housing portion 14 and main housing portion 18 to slide bracket 68 out of lid housing portion 14 as depicted by arrow 74. FIG. 5C depicts a top view of information handling system 10 illustrating the gap 76 created by transition of lid housing portion 14 to the curved configuration. FIG. 5D depicts a side view of information handling system 10 to illustrate synchronized motion of dual axis hinge 66 to coordinate transition to the curved configuration with the sliding bracket moving according to arrow 74 to accommodate additional spacing 78 introduced by the curved configuration. Dual axis hinge 66 can drive the lid housing 14 to have deformation as 78 to provide curvature the lid housing 14 when transitioned to an open position.

Figure 6A:
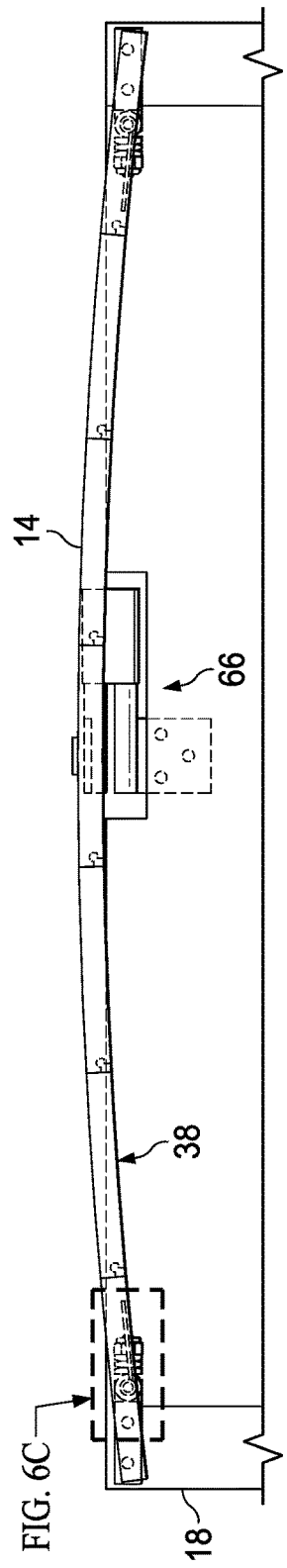
FIGS. 6A, 6B and 6C depict accommodation of transition between curved and planar configurations by perpendicular axis hinges.
Figure 6B:
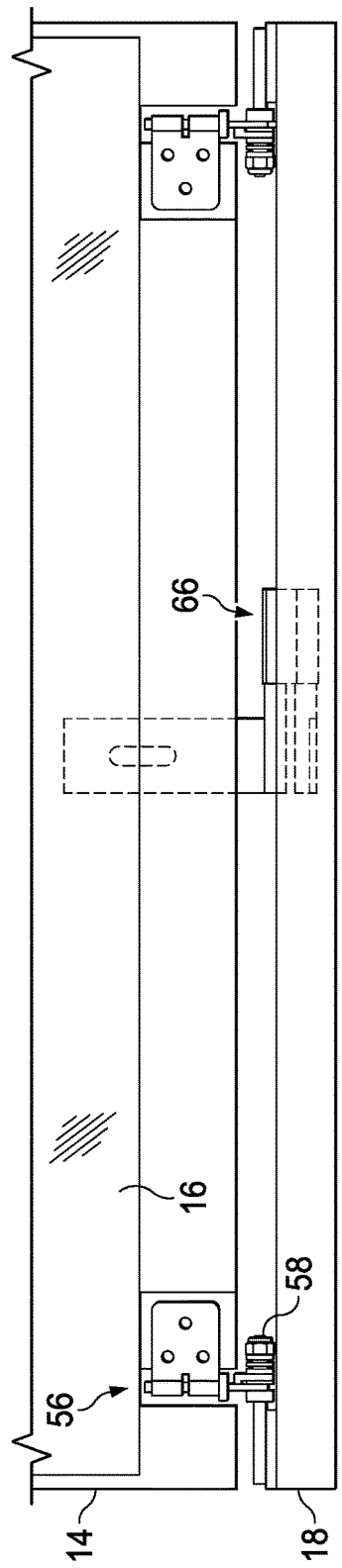
Figure 6C:
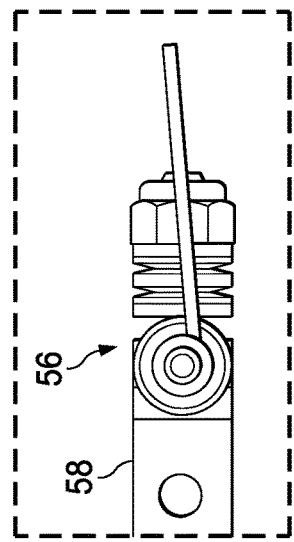

Referring now to FIGS. 6A, 6B and 6C, accommodation of transition between curved and planar configurations by perpendicular axis hinges is depicted. FIG. 6A depicts a top view of information handling system 10 in an open position having the lid portion 14 in the curved configuration. FIG. 6B depicts that rotation to the open position and is about a horizontal axis 58 of the perpendicular axis hinges 56. In the open position, the orientation of the bracket of perpendicular axis hinge 56 rotates slightly as the curve line 38 changes the orientation of lid housing portion 14 to the perpendicular axis hinge 56. FIG. 6C depicts a blown-up view of an example embodiment having a rotation of 4.75 degrees about the vertical axis to adjust for curve line 38. Alternative embodiments may have varying degrees of curve and thus vertical axis rotation.

Figure 7A:
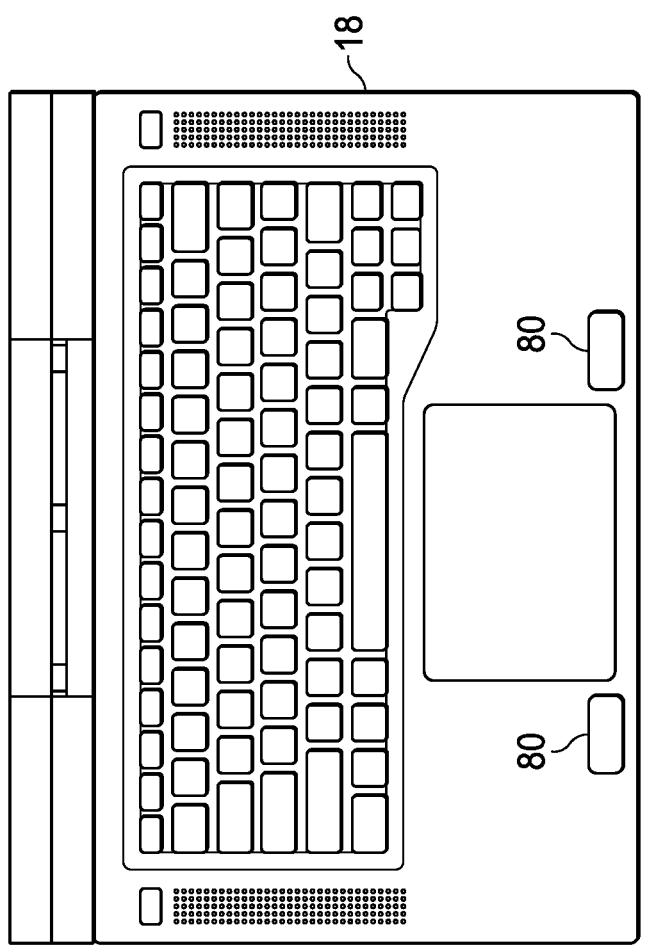
FIGS. 7A and 7B depict magnetic attraction to bias the information handling system to the planar configuration in the closed position.
Figure 7B:
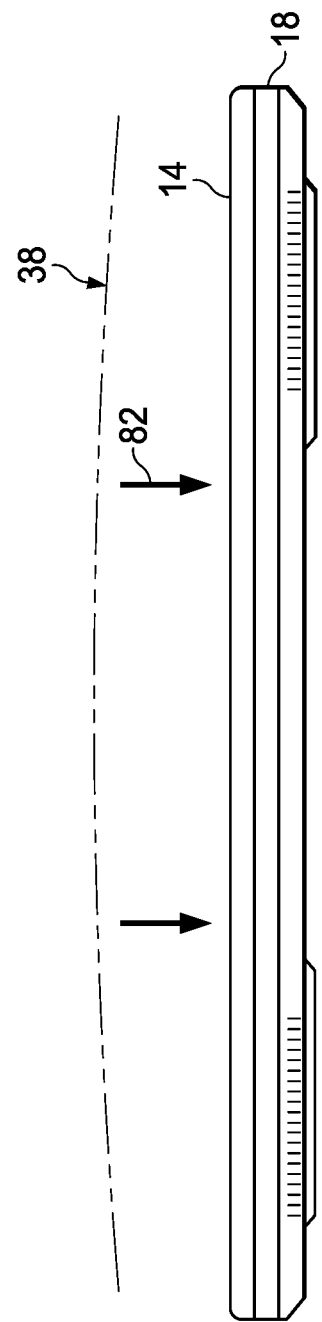

Referring now to FIGS. 7A and 7B, magnetic attraction is depicted to bias the information handling system 10 to the planar configuration in the closed position. In the example embodiment, the sheet metal frame of lid housing portion 14 biases to the curved configuration. The middle position dual axis hinge 66 drives lid housing portion 14 to a planar configuration during rotation to the closed position, however the curve bias of the frame can introduce some rotation to lid housing portion 14 distal the dual axis hinge. FIG. 7A illustrates positions of magnets 80 disposed in main housing portion 18 to attract lid housing portion downward and to the planar configuration as lid housing portion 14 rotates relative to main housing portion 18 to the closed position. FIG. 7B depicts the curve 38 that could be present in lid housing portion 14 without transitioning lid housing portion 14 to the planar configuration. By transitioning to the planar configuration, information handling system 10 reduces its thickness for storage to improve portability as indicated by arrows 82.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having first and second housing portions;
   a processor disposed in the housing and operable to execute instructions to process information;

a memory disposed in the housing and interfaced with the processor to store the instructions and information;

a display assembly coupled to the first housing portion, the display assembly having a foldable display film interfaced with the processor and operable to present information as visual images and having a flexible frame supporting the display film, the flexible frame operable to bend between planar and curved configurations;

first and second perpendicular-axis hinges coupled at opposing ends of the first and second housing portions, each of the first and second perpendicular-axis hinges rotating the first and second housing portions between open and closed positions about a central axis and rotating relative to the first housing portion about a vertical axis perpendicular to the central axis to adapt to the curved configuration; and a dual axis hinge coupled to the first and second housing portions between the first and second perpendicular-axis hinges to rotate about the central axis, the dual axis hinge varying spacing between the first and second housing portions in accordance with a rotational position of the first and second housing portions to adapt to transitions between the planar and curved configurations;

wherein the dual axis hinge comprises a sliding joint coupled to the first housing portion to lengthen in response to a transition from the planar to the curved configuration.

2. The information handling system of claim 1 wherein the foldable display film comprises an organic light emitting diode display film.

3. The information handling system of claim 2 wherein the flexible frame comprises a sheet of metal formed to have the curved configuration.

4. The information handling system of claim 3 wherein metal comprises stainless steel.

5. The information handling system of claim 3 wherein the sheet of metal has plural openings formed to adjust rigidity, the plural openings increasing in size as each of the plural openings increase in distance from the dual axis hinge.

6. An information handling system comprising:
a housing having first and second housing portions;
a processor disposed in the housing and operable to execute instructions to process information;
a memory disposed in the housing and interfaced with the processor to store the instructions and information;
a display assembly coupled to the first housing portion, the display assembly having a foldable display film interfaced with the processor and operable to present information as visual images and having a flexible frame supporting the display film, the flexible frame operable to bend between planar and curved configurations; and
first and second perpendicular-axis hinges coupled at opposing ends of the first and second housing portions, each of the first and second perpendicular-axis hinges rotating the first and second housing portions between open and closed positions about a central axis and rotating relative to the first housing portion about a vertical axis perpendicular to the central axis to adapt to the curved configuration;
wherein the first housing portion further comprises:
plural segments disposed in a plane; and
a pin rotationally coupling adjacent segments for rotation of the adjacent segments about the vertical axis.

7. The information handling system of claim 6 wherein each pin couples at a rounded portion of the plural segments that restricts rotation past the planar configuration opposite the direction of rotation from the planar to the curved configuration.

8. A method for presenting visual images at a portable information handling system integrated display, the method comprising:
storing the portable information handling system in a closed position having first and second housing portions, both the first and second housing portions having a planar configuration in the closed position;
rotating the first and second housing portions relative to each other from the closed position to an open position;
in response to the rotating, automatically transitioning the first housing portion from the planar configuration to a curved configuration; and
presenting the visual images at a display film integrated in the first housing portion and conforming to the curved configuration;
forming the first housing portion from plural rotationally coupled segments;
rotating the segments to define the planar and curved configurations.

9. The method of claim 8 further comprising:
supporting the display film with a metallic sheet formed to have the curved configuration;
rotating the first and second housing portions from the open position to the closed position; and
in response to the rotating the first and second housing portions from the open position to the closed position, automatically transitioning the first housing portion from the curved configuration to the planar configuration.

10. The method of claim 9 further comprising:
coupling a dual axis hinge to the first and second housing portions at a curved portion of the first housing portion when in the curved configuration;
rotating the first and second housing portions between the open and closed positions with the dual axis hinge; and
sliding a bracket of the dual axis hinge at the first housing portion to extend the curved portion out and away from the second housing portion as the housing rotates from the closed to open position.

11. The method of claim 8 further comprising:
coupling the first and second housing portions to each other with first and second perpendicular-axis hinges;
rotating the first and second housing portions between the closed and open positions with a horizontal axle of each of the first and second perpendicular-axis hinges; and
rotating the first housing portion between planar and curved configurations with a vertical axle of each of the first and second perpendicular-axis hinges.

12. The method of claim 8 wherein the display comprises a plastic organic light emitting diode display film.

13. The method of claim 8 further comprising biasing the first housing portion to a planar configuration in the closed position with magnetic attraction to the second housing portion.

14. A display assembly comprising:
a flexible frame having a curved configuration;
a foldable display film disposed on the flexible frame and operable to present information as visual images; and
a housing coupled to the flexible frame and operable to transition the flexible frame between the curved configuration and a planar configuration;

wherein the flexible frame comprises sheet metal having plural openings disposed to adjust rigidity of the flexible frame for transitioning between the curved and planar configurations.

15. The display of claim 14 further comprising:

a first perpendicular-axis hinges coupled to a first end of the housing; and a second perpendicular-axis hinges coupled to a second end of the housing opposite the first end;

wherein each of the first and second perpendicular-axis hinges couple a vertical axis to the housing to support transition between curved and planar configurations, a horizontal axis coupled to an opposing housing to support rotation between closed and open positions.

16. The display of claim 14 further comprising a dual axis hinge having a sliding bracket of one axis of the dual axis hinge coupled to the housing, the sliding bracket adjust a distance between the housing and an opposing housing coupled to a bracket of the other axis of the dual axis hinge.

* * * * *